US008217306B2

(12) United States Patent
Inoue et al.

(10) Patent No.: US 8,217,306 B2

(45) Date of Patent: Jul. 10, 2012

(54) VEHICLE LIGHTING DEVICE

(75) Inventors: Kotoka Inoue, Tokyo (JP); Katsuhiro Murahashi, Tokyo (JP); Hiroto Tokunaga, Tokyo (JP)

(73) Assignee: Ichikoh Industries, Ltd., Tokyo (JP)

( * ) Notice: Subject to any disclaimer, the term of this patent is extended or adjusted under 35 U.S.C. 154(b) by 540 days.

(21) Appl. No.: 12/500,771

(22) Filed: Jul. 10, 2009

(65) Prior Publication Data

US 2010/0008099 A1 Jan. 14, 2010

(30) Foreign Application Priority Data

Jul. 14, 2008 (JP) ................................ 2008-183151

(51) Int. Cl.
*B60Q 1/04* (2006.01)

(52) U.S. Cl. .......... 219/202; 219/220; 362/92; 362/507; 362/294; 362/645

(58) Field of Classification Search .................. 362/507, 362/546, 547, 294, 92; 219/202, 220, 541, 219/542, 544; 307/10.8
See application file for complete search history.

(56) References Cited

U.S. PATENT DOCUMENTS

| | | | | |
|---|---|---|---|---|
| 6,601,983 | B1 * | 8/2003 | Runfola et al. | 362/545 |
| 7,195,365 | B2 * | 3/2007 | Suda et al. | 362/92 |
| 7,914,162 | B1 * | 3/2011 | Huang | 362/92 |
| 2011/0168687 | A1 * | 7/2011 | Door et al. | 219/202 |

FOREIGN PATENT DOCUMENTS

JP 2008-052919 A 3/2008

* cited by examiner

*Primary Examiner* — Anabel Ton

(74) *Attorney, Agent, or Firm* — Foley & Lardner LLP

(57) ABSTRACT

A conventional vehicle lighting device entails a problem on appearance. A vehicle lighting device of the present invention is provided with a wire heater, an extension portion, and a power-feeding portion. An adhesive part is provided at a part of one face of an extension film of the extension portion. Of such one face of the extension film of the extension portion, a letterpress printed-film pattern of a rough portion is provided in a range excluding the adhesive part. As a result, the vehicle lighting device of the present invention provides an ability to reliably prevent an extension film of the extension portion from sticking to a lamp lens by means of the letterpress printed-film pattern of the rough portion; prevent an appearance failure or abnormality exerted by the sticking of the extension film of the extension portion to the lamp lens; and improve its appearance.

20 Claims, 9 Drawing Sheets

VEHICLE LIGHTING DEVICE

CROSS-REFERENCE TO RELATED APPLICATIONS

The present application claims priority to and incorporates by reference the entire contents of Japanese priority document 2008-183151 filed in Japan on Jul. 14, 2008.

BACKGROUND OF THE INVENTION

The present invention relates to a vehicle lighting device in which a lamp lens forms a snow-melting (ice-melting, cloud-proof) structure.

Conventionally, the vehicle lighting device of this type has been known (Patent Document 1, Japanese Laid-open Patent Application No. 2008-52919, for example). Hereinafter, the conventional vehicle lighting device will be described. The conventional vehicle lighting device is provided with: a lamp lens; a wire heater provided by being transferred to the lamp lens; and a power-feeding portion for feeding a power current to the wire heater.

Hereinafter, an effect of the conventional vehicle lighting device will be described. When a power current is fed from the power-feeding portion to the wire heater, the wire heater is heated, and snow, ice, or cloud adhering to the lamp lens is then melted or removed due to a heat from the heater. As a result, a loss of light illuminated from the lamp lens to the outside can be prevented. In particular, this is effective in a vehicle lighting device using a light source which is low at a temperature of light illuminated from the lamp lens in comparison with a halogen bulb or an incandescent bulb, for example, a semiconductor-type light source such as a LED or an electric discharge lamp such as an HID.

The problem to be solved by the invention is to improve the conventional vehicle lighting device described previously.

SUMMARY OF THE INVENTION

A first aspect of the invention is directed to a vehicle lighting device, comprising:

(i) a lamp housing, which partitions a lamp room, and a lamp lens;

(ii) a light illumination portion which is disposed in the lamp room, for illuminating light to an outside through the lamp lens;

(iii) a wire heater which is provided, by means of transfer, at a portion through which light from the light illumination portion is permeated, among the lamp lens;

(iv) an extension portion which is integrally provided by a predetermined length from the wire heater; and (v) a power feeding portion which is provided at a tip end part of the extension portion, for feeding a power current to the wire heater via the extension portion, wherein the wire heater is a transfer-type wire heater including:

(a) a base film;

(b) an adhesive which is provided on one face of the base film;

(c) an electrically conductive member for heater, which is formed in a wire pattern on the other face of the base film, a power current being fed, thereby generating a heat;

(d) a resist which is provided on the other face of the base film so as to cover the electrically conductive member for heater, at least the base film being cut in a pattern that follows the wire pattern of the electrically conductive member for heater and which is caused to adhere the adhesive to the lamp lens, thereby transferring the electrically conductive member for heater to the lamp lens, the extension portion including:

(e) an extension film which is integrally provided by a predetermined length from the base film; and (f) an electrically conductive member for extension which is formed in a wire pattern on one face of the extension film, one end of which is electrically connected to the electrically conductive member for heater, an adhesive part to be adhered to the lamp lens being provided at a part of a face at a side opposite to the lamp lens, among the extension film, a rough portion being provided on the face at the side opposite to the lamp lens, among the extension film of the extension portion, the face being a portion other than the adhesive portion, the power-feeding portion including:

(g) a power-feeding film which is integrally provided at a tip end part of the extension film;

(h) a power-feeding electrically conductive member which is formed in a wire pattern on one face of the power-feeding film, one end of which is electrically connected to the electrically conductive member for extension; and (i) a connector which is electrically connected to the power-feeding electrically conductive member and is fixed to the lamp lens, together with the power-feeding film.

A second aspect of the present invention is directed to the vehicle lighting device according to the first aspect, wherein:

the adhesive part of the extension portion is provided at a side of the wire heater.

A third aspect of the present invention is directed to the vehicle lighting device according to the first aspect, wherein:

a wire pattern of the electrically conductive member for extension of the extension portion and a wire pattern of the power-feeding electrically conductive member of the power-feeding portion each are thick and short in comparison with a wire pattern of the electrically conductive member for heater, of the wire heater.

A fourth aspect of the present invention is directed to a vehicle lighting device, comprising:

(i) a lamp lens;

(ii) a wire heater which is transferred to an interior face of the lamp lens and is capable of generating a heat in accordance with feeding of a power current;

(iii) a power-feeding portion for feeding the power current to the wire heater; and (iv) an extension portion which is extended from the wire heater by a predetermined length, is arranged on the interior face of the lamp lens, and electrically connects the wire heater and the power-feeding portion in order to feed the power current from the power-feeding portion to a side of the wire heater, the extension portion including:

an adhesive part which is disposed on a face opposite to the interior face of the lamp lens, for adhering to the interior face of the lamp lens; and a non-adhesive part which is disposed on the face opposite to the interior face of the lamp lens and which is constituted in a manner free of adhering to the interior face of the lamp lens so as to prevent a part other than the adhesive part from sticking to an interior face of the lamp lens.

A fifth aspect of the present invention is directed to the vehicle lighting device according to the fourth aspect, wherein:

the non-adhesive part of the extension portion is constituted of a rough portion formed by a optically permeable letterpress printed-film pattern.

A sixth aspect of the present invention is directed to the vehicle lighting device according to the fourth aspect, wherein: the non-adhesive part of the extension portion includes at least any of:

a letterpress printed-film pattern forming a rough line in a lengthwise direction of the extension portion;

a letterpress printed-film pattern forming a rough line, orthogonal to the lengthwise direction of the extension portion; and a letterpress printed-film pattern forming a rough line in a staggered shape, orthogonal to the lengthwise direction of the extension portion.

A seventh aspect of the present invention is directed to the vehicle lighting device according to the fourth aspect, wherein:

the non-adhesive part of the extension portion is formed in a letterpress printed-film pattern having thickness of about 30 to 100 micrometers.

An eighth aspect of the present invention is directed to the vehicle lighting device according to the fourth aspect, wherein:

the non-adhesive part of the extension portion is constituted so that an occupying area relative to the extension portion is wider than an occupying area of the adhesive part relative to the extension portion.

A ninth aspect of the present invention is directed to the vehicle lighting device according to the fourth aspect, wherein:

the non-adhesive part of the extension portion constitutes the non-adhesive part having a non-adhesive property, together with the power-feeding portion; and a side of the power-feeding portion of the non-adhesive part is swaged and fixed together with a power terminal, by means of a swaging portion of the connector provided at the power-feeding portion, at a position of a side wall erected laterally in the lamp lens.

A tenth aspect of the present invention is directed to the vehicle lighting device according to the fourth aspect, wherein:

the lamp lens causes a lamp unit having a light source to be disposed on a front face in the lens;

the wire heater is optically permeable and arranged on the front face in the lamp lens;

the power-feeding portion is arranged on the side wall erected laterally in the lamp lens; and the extension portion has a length connecting the wire heater and the power-feeding portion to each other.

An eleventh aspect of the present invention is directed to the vehicle lighting device according to the fourth aspect, wherein:

the extension portion is smaller than the wire heater in width.

A twelfth aspect of the present invention is directed to the vehicle lighting device according to the fourth aspect, wherein:

the wire heater includes an adhesive part adhering to the interior face of the lamp lens;

the adhesive part of the extension portion is arranged on a side of the wire heater, and constitute a viscous portion with viscous property, together with the adhesive part of the wire heater; and the adhesive part of the extension portion is adhered to the front face of the lamp lens by means of the adhesive part, together with the wire heater.

A thirteenth aspect of the present invention is directed to the vehicle lighting device according to the fourth aspect, wherein:

the power-feeding portion has a connector, one end of which is connected to a power terminal, and is provided on the side wall erected laterally in the lamp lens, together with the connector; and a portion of the non-adhesive part of the extension portion connects to the other end of the connector and is fixed to the side wall in the lamp lens.

A fourteenth aspect of the present invention is directed to the vehicle lighting device according to the thirteenth aspect, wherein:

the connector of the power-feeding portion includes a swaging portion for swaging and fixing the power terminal and the portion of the non-adhesive part of the extension portion in a multilayered state.

A fifteenth aspect of the present invention is directed to the vehicle lighting device according to the fourth aspect, wherein:

at least one part of the extension portion is manufactured in an identical process, together with the wire heater and the power-feeding portion.

A sixteenth aspect of the present invention is directed to the vehicle lighting device according to the fourth aspect, wherein:

the wire heater includes:

an adhesive part adhering to the interior face of the lamp lens;

a resin film portion multilayered on the adhesive part;

an electrically conductive paste portion which is multilayered on the resin film portion and formed in a predetermined wire pattern, for generating a heat due to an electrical resistance in accordance with the feeding of the power current; and an insulation resist portion which is multilayered on the electrically conductive paste portion, for surface-protecting the electrically conductive paste portion;

the extension portion includes:

a resin film portion extended from the resin film portion of the wire heater; and an electrically conductive paste portion extended from the electrically conductive film portion of the wire heater;

the extension portion in a process identical to that of manufacturing the resin film portion of the wire heater, the resin film portion of the extension portion is manufactured in a process identical to that of a resin film portion of the wire heater; and the electrically conductive paste portion of the extension portion is manufactured in a process identical to that of an electrically conductive paste portion of the wire heater.

A seventeenth aspect of the present invention is directed to the vehicle lighting device according to the sixteenth aspect, wherein:

the power-feeding portion includes:

a resin film portion extended from the resin film portion of the extension portion; and an electrically conductive paste portion extended from the electrically conductive paste portion of the extension portion, the resin film portion of the extension portion is manufactured in a process identical to that of a respective resin film of the wire heater and the power-feeding portion; and the electrically conductive paste portion of the extension portion is manufactured in a process identical to that of a respective electrically conductive paste portion of the wire heater and the power-feeding portion.

An eighteenth aspect of the present invention is directed to the vehicle lighting device according to the sixteenth aspect, wherein:

the electrically conductive paste portion of the extension portion is thicker and shorter than the electrically conductive paste portion of the wire heater.

A nineteenth aspect of the present invention is directed to the vehicle lighting device according to the seventeenth aspect, comprising:

(i) a lamp lens;

(ii) a wire heater which is transferred to an interior face of the lamp lens and is capable of generating a heat in accordance with feeding of a power current;

(iii) a power-feeding portion for feeding the power current to the wire heater; and (iv) an extension portion which is extended from the wire heater by a predetermined length, is arranged on the interior face of the lamp lens, and electrically connects between the wire heater and the power-feeding portion in order to feed the power current from the power-feeding portion to a side of the wire heater, the extension portion including:

an adhesive portion which is disposed on a face opposite to the interior face of the lamp lens, for adhering to the interior face of the lamp lens;

an non-adhesive portion which is disposed on a face opposite to the interior face of the lamp lens and which is constituted in a manner free of adhering to the interior face of the lamp lens in order to prevent a part other than the adhesive part from adhering to the interior face of the lamp lens, wherein the adhesive part of the extension portion is fixed to a front face in the lamp lens, together with the wire heater; and the non-adhesive part of the extension portion is fixed on a side wall erected laterally in the lamp lens, together with the power-feeding portion.

A twentieth aspect of the present invention is directed to the vehicle lighting device according to the nineteenth aspect, wherein:

the non-adhesive part of the extension portion is made up of a rough portion formed by an optically permeable letterpress printed-film pattern.

In a vehicle lighting device according to a first aspect of the present invention, a rough portion is provided at a face at a side opposite to a lamp lens, the face being a portion other than an adhesive portion, of an extension film of an extension portion. With this rough portion, the extension film of the extension portion can be reliably prevented from sticking to the lamp lens and an appearance failure or abnormality due to the sticking of the extension film of the extension portion to the lamp lens can be prevented, making it possible to improve its appearance.

In addition, in the vehicle lighting device according to the first aspect of the present invention, an adhesive portion is provided at a part of the face at the side opposite to the lamp lens, of the extension film of the extension portion. Thus, with the adhesive portion of such a part, the extension film of the extension portion can be reliably adhered to the lamp lens and the appearance or design is never degraded. In other words, it is difficult to adhere the entire extension film of the extension portion to a curved face of the lamp lens, the appearance or design has been degraded, or if the entire extension film of the extension portion is not adhered to the lamp lens, a load is applied on an adhesive of a wire heater, and the wire heater may be released. However, in the vehicle lighting device according to the first aspect of the present invention, a part of the extension film of the extension portion is adhered to the lamp lens, so that the extension film of the extension portion can be reliably adhered to the lamp lens and the appearance or design is never degraded.

Moreover, in the vehicle lighting device according to the first aspect of the present invention, an extension portion made up of an extension film and an electrically conductive member for extension is provided between a wire heater and a power-feeding portion, thus eliminating a harness. As a result, in the vehicle lighting device according to the first aspect of the present invention, manufacturing cost can be reduced in comparison with the vehicle lighting device in which a power-feeding portion is made of a harness. In addition, there is no problem on durability that: a wire heater transferred to a lamp lens due to the weight of the harness is released from the lamp lens; a load is applied onto the wire heater; or the lamp lens is damaged by the harness.

Further, in the vehicle lighting device of the first aspect of present invention, by means of an extension portion provided between a wire heater and a power-feeding portion, the wire heater and the power-feeding portion can be provided, respectively, at separate positions of a lamp lens, which are distant from each other, while electrical connection between the wire heater and the power-feeding portion is maintained. As a result, in the vehicle lighting device according to the first aspect of the present invention, the wire heater can be provided at a portion illuminated with light, of the lamp lens, and the power-feeding portion can be provided at a inconspicuous portion of the lamp lens (i.e., a portion which is free of light illumination and which is not required to provide a wire heater, such as a side wall or an erected wall mounted to a lamp housing, for example). In this manner, in the vehicle lighting device according to the first aspect of the present invention, there is no need to provide the power-feeding portion at a conspicuous portion of the lamp lens, so that a problem such as impairment of appearance or impairment of design can be solved. In addition, there is no need to provide the wire heater up to the inconspicuous portion of the lamp lens, so that a problem on manufacturing cost or power consumption can be solved as well.

Furthermore, in the vehicle lighting device according to the first aspect of the present invention, by means of an extension portion provided between a wire heater and a power-feeding portion, the wire heater and the power-feeding portion can be fixed, respectively, at separate positions of a lamp lens, which are distant from each other, and thus, the wire heater can be reliably and easily transferred to the lamp lens. In other words, it is difficult to adjacently transfer to the lamp lens, the wire heater and the power-feeding portion having a larger width than that of the wire heater. However, in the vehicle lighting device according to the first aspect of the present invention, there is no need to adjacently fix to the lamp lens the wire heater and the power-feeding portion having a larger width than that of the wire heater, and thus, the wire heater can be reliably and easily transferred to the lamp lens.

Moreover, in the vehicle lighting device according to the first aspect of the present invention, a wire heater is made up of a base film (film for heater) and an electrically conductive member for heater, whereas an extension portion is made up of an extension film and an electrically conductive member for extension. Further, a power-feeding portion is made up of a power-feeding film and a power-feeding electrically conductive member. Thus, in the vehicle lighting device according to the first aspect of the present invention, the base film (film for heater) of the wire heater and the extension film of the extension portion, and a power-feeding film of the power-feeding portion, or alternatively, a electrically conductive member for heater of the wire heater, an electrically conductive member for extension of the extension portion, and a power-feeding electrically conductive member of the power-feeding portion can be manufactured in accordance with the same process, there is no need for a new manufacturing process, and thus, manufacturing cost can be reduced accordingly.

In addition, in a vehicle lighting device according to a second aspect of the present invention, an adhesive part of an extension portion is provided at a wire heater side, and thus, by means of the adhesive part of the extension portion at the wire heater side, a load on an adhesive of the wire heater can be reduced, and the release of the wire heater from a lamp lens can be reliably prevented accordingly.

Further, in a vehicle lighting device according to a third aspect of the present invention, a wire pattern of an electrically conductive member for extension of an extension portion, and a wire pattern of a power-feeding electrically conductive member of a power-feeding portion, are thick and short in comparison with a wire pattern of an electrically conductive member for heater of a wire heater. Thus, an electrical resistance value of each of the wire pattern of the electrically conductive member for extension of the extension portion, and the wire pattern of the power-feeding electrically conductive member of the power-feeding portion, is small in comparison with an electrical resistance value of the wire pattern of the electrically conductive member for heater of the wire heater. Further, a power current can be fed to the wire heater accordingly, with no temperature rise in the wire pattern of the electrically conductive member for extension of the extension portion and the wire pattern of the electrically conductive member for extension of the extension portion. As a result, the vehicle lighting device according to the third aspect of the present invention can save power, and moreover, even if the electrically conductive member for extension of the extension portion, and the power-feeding electrically conductive member of the power-feeding portion are electrically connected to the electrically conductive member for heater of the wire heater, an electrical resistance value design of the wire pattern of the electrically conductive member for heater of the wire heater is not influenced. (This wire pattern has thin and long lines, thus, there being a limitation to uniformly obtaining electrical resistance values in all required parts.)

DESCRIPTION OF THE PREFERRED EMBODIMENTS

Figure 1:
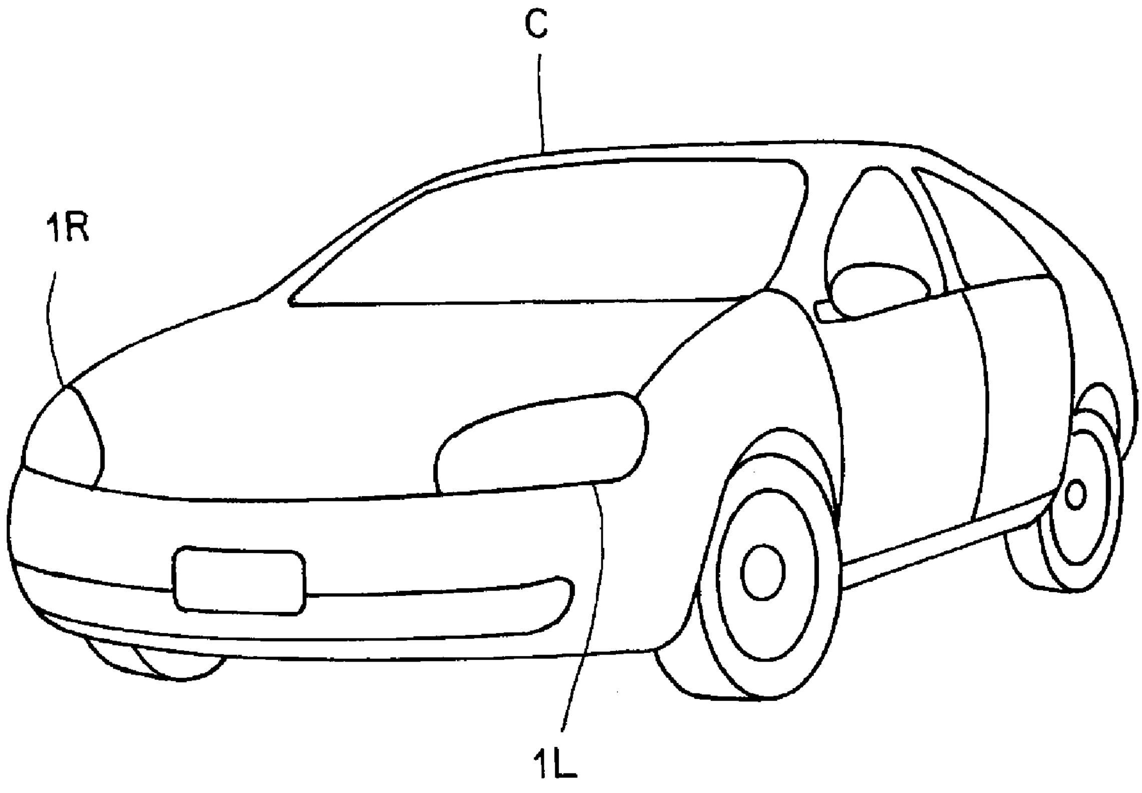
FIG. 1 shows an embodiment of a vehicle lighting device according to the present invention and is an exemplary view of a state in which the lighting device is used in a vehicle headlamp.

Hereinafter, one of the embodiments of the vehicle lighting device according to the present invention will be described in detail, referring to the drawings. These embodiments do not limit the present invention.

Embodiment

Hereinafter, a constitution of the vehicle lighting device according to the embodiment will be described. The vehicle lighting device according to the first embodiment includes head lamps 1L, 1R for vehicles, illuminating a predetermined light distribution pattern, for example, a light distribution pattern for passing. The head lamps 1L, 1R are equipped at both left and right sides of a front part of a vehicle C, respectively, as shown in FIG. 1. Hereinafter, the left-side head lamp 1L will be described. A structure of the right-side head lamp 1R is substantially reversed at the left and right sides from that of the left-side head lamp 1L.

Figure 2:
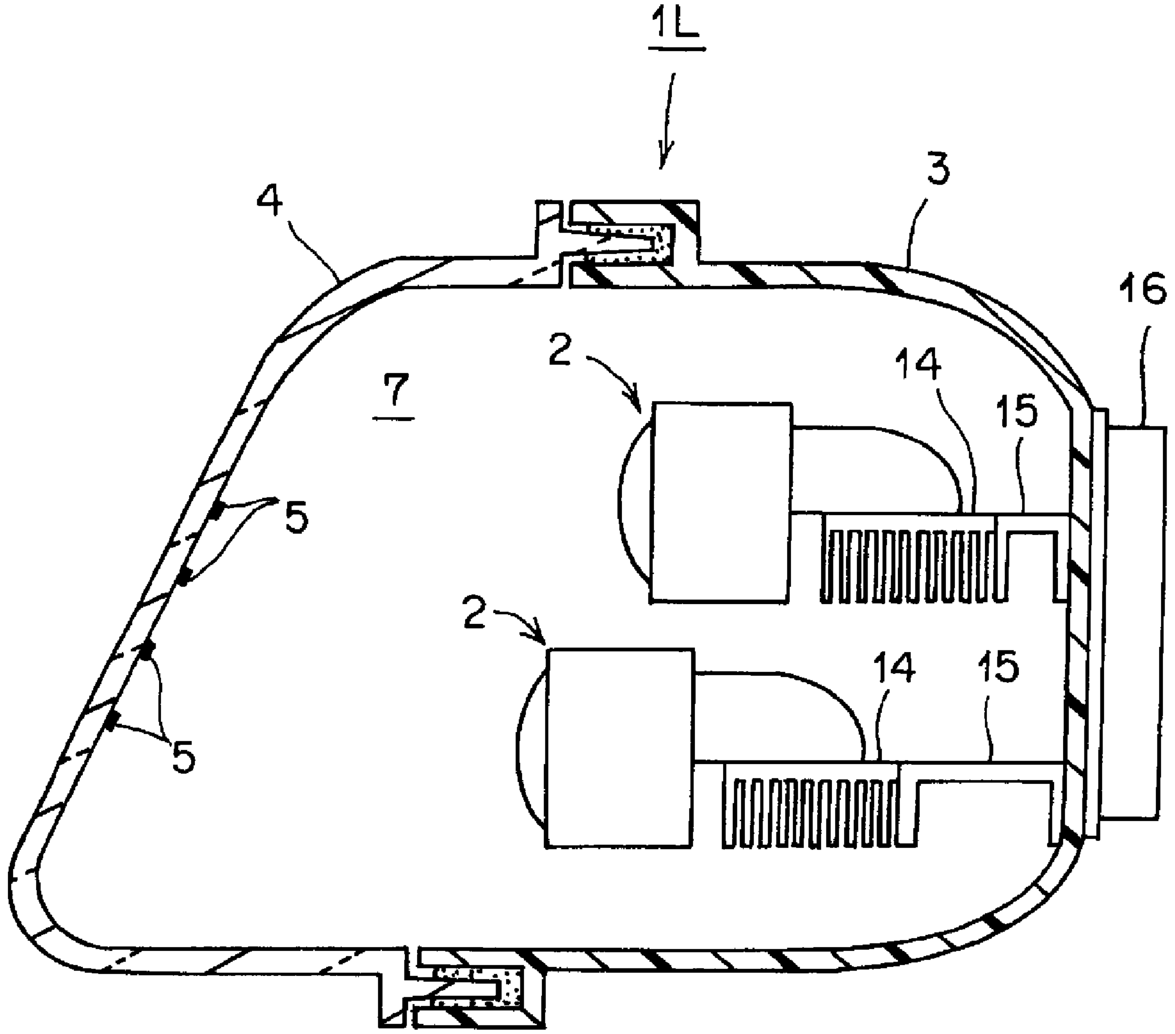
FIG. 2 is a vertical cross-sectional view (longitudinal cross-sectional view) of the headlamp, similarly.
Figure 4:
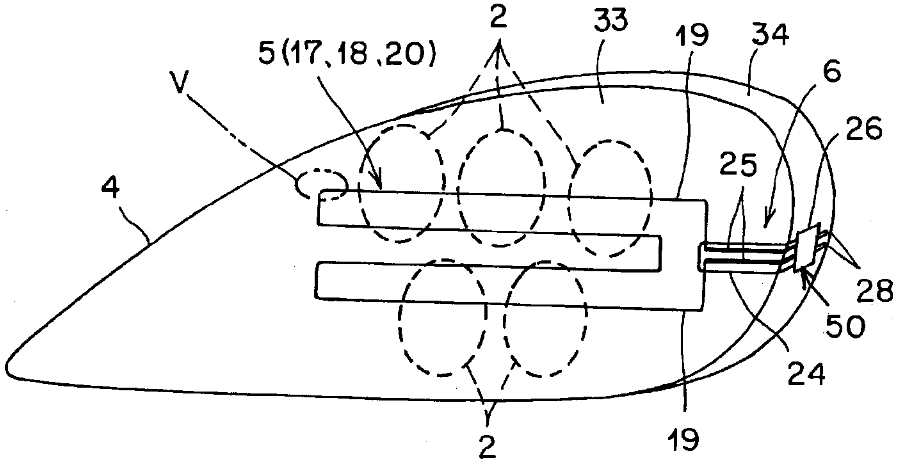
FIG. 4 is a perspective view showing a lamp lens used in the headlamp, similarly.

The head lamp 1L, as shown in FIGS. 2 and 4, is provided with: five lamp units 2; a lamp housing 3; a lamp lens 4; a wire heater 5; an extension portion 6; and a power-feeding portion 50. A lamp room 7 is partitioned by the lamp housing 3 and the lamp lens 4. In the lamp room 7, the five lamp units 2 are disposed at the upper and lower stages, separately (three of them are disposed at the upper stage and the remaining two of them at the lower stage in the embodiment).

Figure 3:
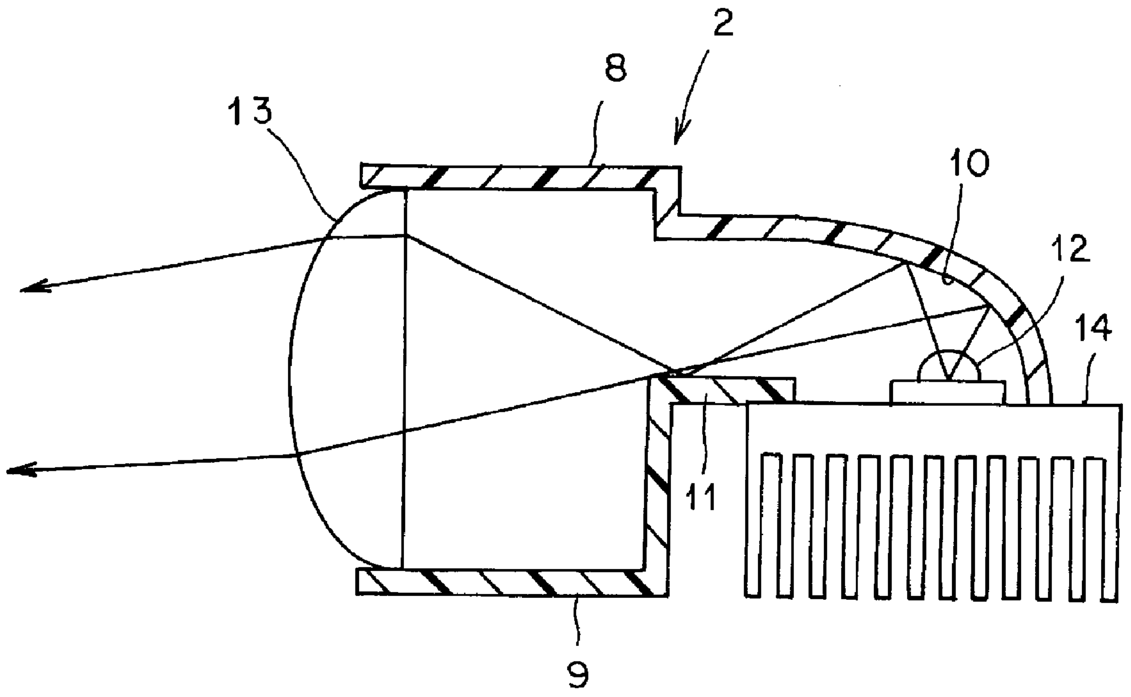
FIG. 3 is a vertical cross-sectional view (longitudinal cross sectional view) of a lamp unit used in the headlamp, similarly.

The lamp unit 2 constitutes a light illuminating portion for externally illuminating light through the lamp lens 4. The lamp unit 2 illuminates (radiates, emits) a predetermined light distribution pattern, a light distribution pattern for passing, in the embodiment. The lamp unit 2, as shown in FIG. 3, is of a projector type, and forms a unitary structure. The lamp unit 2 is made up of; an upper reflector 8 and a lower reflector 9; a reflecting surface 10 and a shade 11; a semiconductor-type light source 12; a projecting lens (convex lens, focusing lens) 13; and a heat sink member 14.

The lamp unit 2 is mounted on the lamp housing 3 via a holder member 15, as shown in FIG. 2. A heat sink member 16 is provided in the lamp housing 3. The heat sink member 16 at the side of the lamp housing 3 and the heat sink member 14 at the side of the lamp unit 2 are connected to each other via the holder member 15 and the lamp housing 3.

The semiconductor-type light source 12 uses a self-emitting semiconductor-type light source such as an LED or an EL (organic EL). (The LED is used in this embodiment). Thus, a heat is generated in the semiconductor-type light source 12 per se, whereas a heat due to the light from the semiconductor-type light source 12 is hardly generated. Therefore, snow, ice, or cloud is prone to adhere onto the lamp lens 4.

The lamp lens 4 is a substantially plain lens, and it is a so called outer cover (outer lens). The lamp lens 4 is molded from a synthetic resin such as PC (polycarbonate), for example, in the embodiment. In addition, the lamp lens 4, as shown in FIG. 2, is slanted (inclined) from top to bottom, from rear to front, on a longitudinal cross section (vertical cross section). Further, the lamp lens 4 is formed in a sectional concave shape, and is made up of: a front part (or frontal part) 33 through which the light illuminated from the lamp unit 2 permeates; and a side wall part 34 integrally extended rearwardly of the entire peripheral rim of the front part 33. A corner part is formed between the front part 33 and the side wall part 34. An interior face of the front part 33 is curved. In addition, the side wall part 34 is formed in an erected-wall shape. In a case where the lamp lens 4 is made of PC, a heat resistance temperature of the lamp lens 4 is 130 degrees Celsius.

Figure 5:
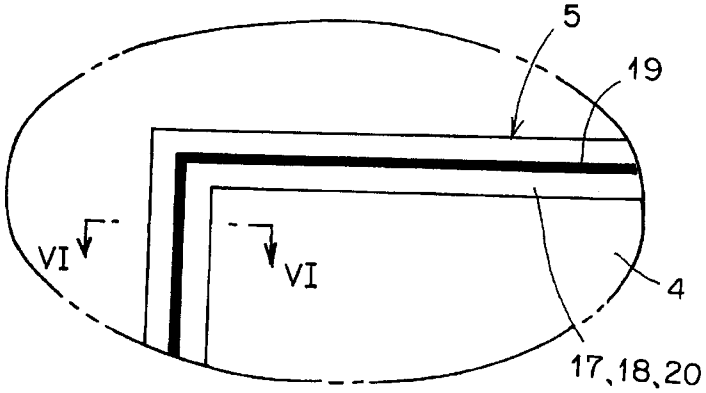
FIG. 5 is an enlarged view taken along the V-portion in FIG. 4, similarly.
Figure 6:
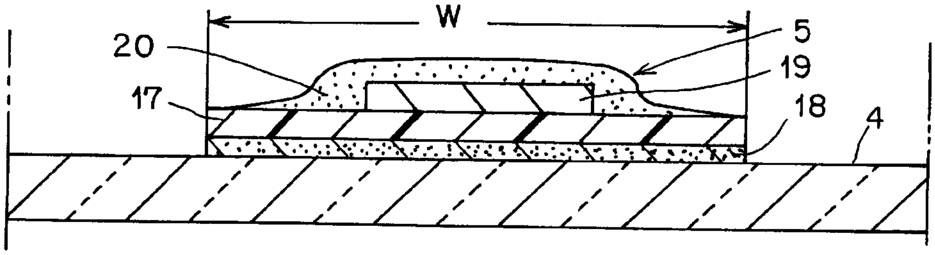
FIG. 6 is a cross-sectional view taken along the line VI-VI in FIG. 5, similarly.

The wire heater 5 is a transfer-type wire heater, and is provided by means of transfer on an interior face of the front part 33 of the lamp lens 4. The wire heater 5 provided by means of transfer on the interior face of the front part 33 of the lamp lens 4, as shown in FIGS. 5, 6, and 10, are made up of: a base film (film for heater) 17; an adhesive (adhesive layer) 18; an electrically conductive paste portion 19 for heater as an electrically conductive member for heater; and a resist 20. In addition, it is preferable that the wire heater 5 is optically permeable.

The base film 17 is made of a transparent film made of a synthetic resin, for example, PET (polyethylene terephthalate). The adhesive 18 is provided on one face of the base film 17.

On the other face of the base film 17, the electrically conductive paste 19 for heater is formed in a wiring pattern. The wiring pattern of the electrically conductive paste 19 for heater, as shown in FIG. 4, in the embodiment, is a wiring pattern in which upper and lower four transverse wires substantially parallel to each other are continuous from the left to the right in a zigzag pattern, via two left-side longitudinal wires and one right-side longitudinal wire. From the right side of the top and bottom two transverse wires, two longitudinal wires are continuously formed as a terminal part. The electrically conductive paste 19 for heater is an electrically conductive ink, and is made of a metal paste such as a silver paste, a gold paste, a copper paste, or an aluminum paste, in the embodiment. A power current is fed, whereby the electrically conductive paste 19 for heater generates heat due to an electrical resistance of the electrically conductive paste.

On the other face of the base film 17, the resist 20 is provided so as to cover the electrically conductive paste 19 for heater. The resist 20 is adapted to electrically insulate the electrically conductive paste 19 for heater and protect from an external shock. In other words, this resist is a surface protection coat of the electrically conductive paste 19 for heater. The resist 20 is made of a urethane-based or an acryl-based adhesive in the embodiment.

At least either of the base film 17 and the resist 20 is colored. In other words, a colored layer is provided on one face or the other face of the base film 17. Alternatively, the base film 17 per se or the resist 20 per se is colored.

The base film 17 (including the adhesive 18 in the embodiment) is cut in a pattern that follows a wire pattern of the electrically conductive paste 19 for heater. A width W of the cut base film 17 is about 0.5 mm in the embodiment, and is substantially equal to that of the resist 20. As shown in FIGS. 10A to 10G, after the base film 17 has been cut, the adhesive 18 is adhered to the interior face of the front part 33 of the lamp lens 4, and the electrically conductive paste 19 for heater, of a wire pattern, is transferred to the interior face of the front part 33 of the lamp lens 4, using a separator 21 which is disposed at the side of the resist 20. In this manner, the wire heater 5 is provided by means of transfer on the interior face of the front part 33 of the lamp lens 4.

The separator 21, as shown in FIGS. 10A to 10G, is released from the side of the resist 20 after the electrically conductive paste 19 for heater of the wire pattern has been transferred to the interior face of the front part 33 of the lamp lens 4. The separator 21 is shaped like a sheet having a size and a shape to an extent such that the wire heater 5 formed in the patterned shape that follows the wire pattern of the electrically conductive paste 19 for heater can be placed and can be transferred onto the interior face of the front part 33 of the lamp lens 4. In addition, the separator 21 is made of a flexible material, a rubber material such as urethane in the embodiment so that it can follow a curved interior face of the front part 33 of the lamp lens 4.

At the wire heater 5, the extension portion 6 and the power-feeding portion 50 are provided as shown in FIGS. 4 and 7 to 9. Like the wire heater 5, the extension portion 6 and the power-feeding portion 50 are provided on the interior face (at the side of the lamp room 7) of the front part 33 and the side wall part 34 of the lamp lens 4. In addition, the power-feeding part 50 is provided at a part which less influences a design of the lamp lens 4, i.e., at the side wall part 34 of the lamp lens 4.

The extension portion 6 is integrally provided by a predetermined length from the wire heater 5 (i.e., by a predetermined length within a sufficient reach from: the wire heater 5 in which the power-feeding portion 50 is provided at the front part 33 of the lamp lens 4: to the side wall part 34 of the lamp lens 4). The extension portion 6 is made up of an extension film 24 and an electrically conductive paste 25 for extension as an electrically conductive member for extension. The extension film 24 is integrally provided by a predetermined length from the base film 17 of the wire heater 5. The electrically conductive paste 25 for extension is formed on two wire patterns on one face of the extension film 24, and, at one end thereof, is electrically connected to a terminal part of the electrically conductive paste 19 for heater.

Figure 8:
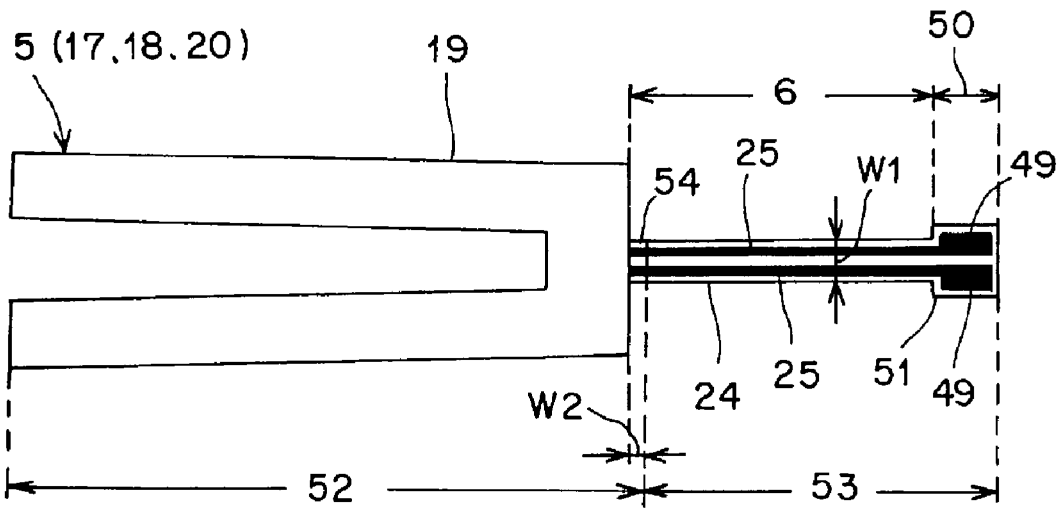
FIG. 8 is a plan view showing a wire heater, an extension portion, and a power-feeding portion, similarly.

As shown in FIG. 8, an adhesive part 54 to be adhered to the lamp lens 4 is provided at a part of the other face of the extension film 24 of the extension portion 6 (i.e., a face opposite to the lamp lens 4). The adhesive part 54 of the extension portion 6 is provided at the side of the wire heater 5, and is adhered to the front part 33 of the lamp lens 4 together with the adhesive 18 of the wire heater 5. A width W2 of the adhesive part 54 of the extension portion 6 is about 1 to 5 mm in the embodiment. In the adhesive part 54 of the extension portion 6, an adhesive layer is provided on the other face of the extension film 24 of the extension portion 6. As a result, the adhesive 18 of the wire heater 5 and the adhesive part 54 of the extension portion 6 constitute an adhesive layer part 52, whereas a part other than the adhesive part 54 of the extension portion 6 and the power-feeding portion 50 constitute a non-adhesive part 53. The power-feeding portion 50 may be an adhesive layer part. In this case, a part other than the adhesive part 54 of the extension portion 6 (a portion of a range enclosed in the double dashed line shown in FIG. 9) becomes a non-adhesive layer part.

Figure 9:
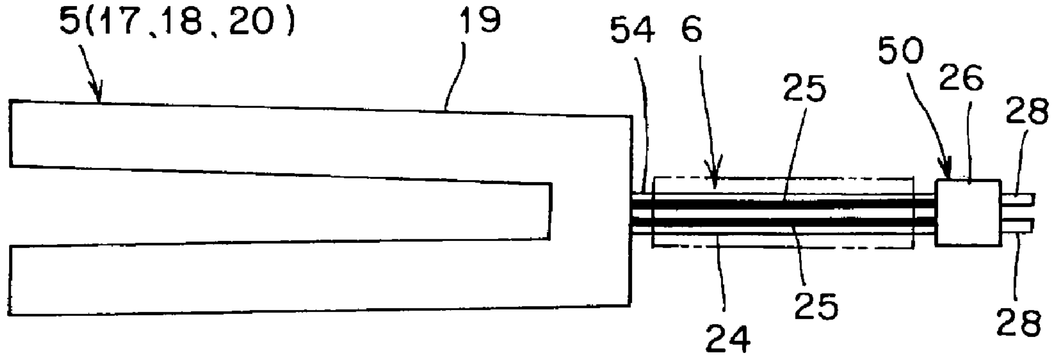
FIG. 9 is a plan view showing a wire heater, an extension portion, and a connector, similarly.

As shown in FIG. 11, a rough portion is provided in a range excluding the adhesive part 54, the range being enclosed in the double dashed line shown in FIG. 9, on one face of the extension film 24 of the extension portion 6 (a face at a side opposite to the lamp lens 4). The rough portion is formed by filming a transparent letterpress printed-film pattern 55. It is desirable that the letterpress printed-film pattern 55 be filmed in a line shape. In addition, the thickness W3 of the letterpress printed-film pattern 55 is defined to be about 30 to 100 micrometers.

Figure 11A:
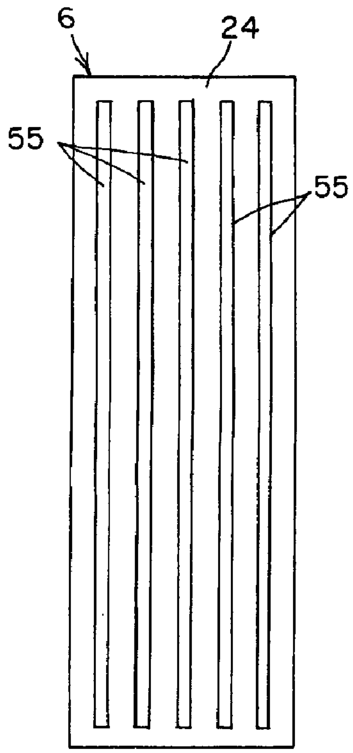
FIGS. 11A to 11F are explanatory views of a letterpress printed-film pattern.
Figure 11C:
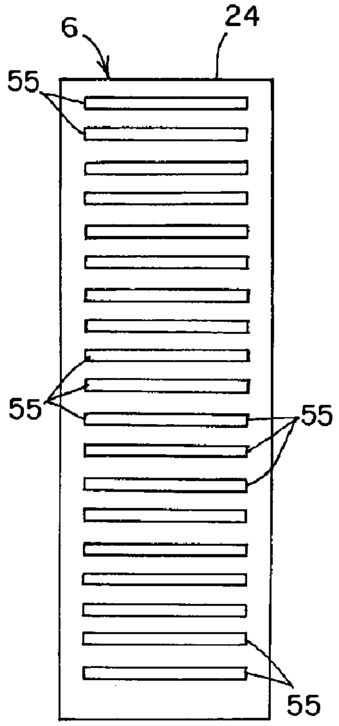
Figure 11E:
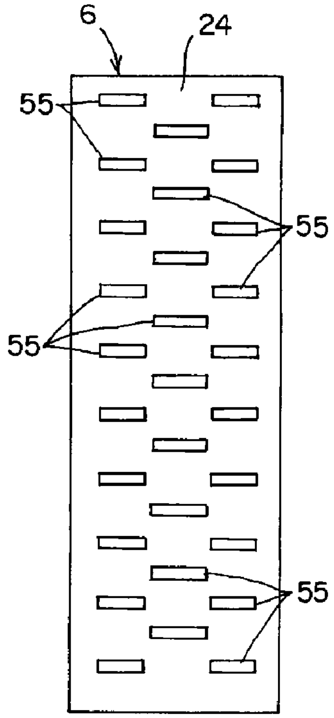
Figure 11B:
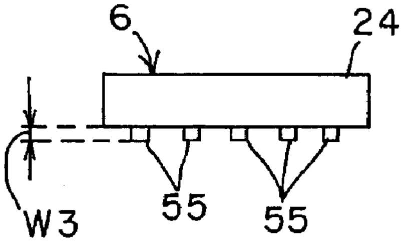
Figure 11D:
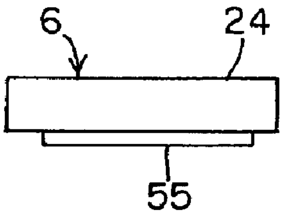
Figure 11F:
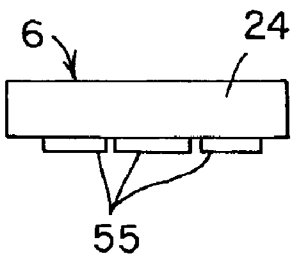

FIGS. 11A and 11B are explanatory views each showing a letterpress printed-film pattern of vertical lines. FIGS. 11C and 11D are explanatory views each showing a letterpress printed-film pattern of horizontal lines. FIGS. 11E and 11F are explanatory views each showing a letterpress printed-film pattern of staggered (alternate) short horizontal lines.

The power-feeding portion 50 is provided at a tip end part of the extension portion 6, and feeds power current to the wire heater 5 via the extension portion 6. The power-feeding portion 50 is made up of: a power-feeding film 51; a power-feeding electrically conductive paste 49 as a power-feeding electrically conductive member; and a connector 56. The power-feeding film 51 is integrally provided at a tip end part of the extension film 24 of the extension portion 6. The power-feeding electrically conductive paste 49 is formed on two wire patterns on one face of the power-feeding film 51, and, at one end thereof, is electrically connected to the other end (tip end) of a respective one of the two electrically conductive paste 25 for extension of the extension portion 6. The connector 26 is electrically connected to the power-feeding electrically conductive paste 49 and is fixed to the side wall part 34 of the lamp lens 4 together with the power-feeding film 51.

The extension film 24 of the extension portion 6 is integrally extended from the base film 17 of the wire heater 5. On the other hand, the power-feeding film 51 of the power-feeding portion 50 is integrally extended from the extension film 24 of the extension portion 6. Like the base film 17, the extension film 24 and the power-feeding film 51 are made of a transparent film made of a synthetic resin, for example, PET (polyethylene terephthalate). The width W1 of the extension film 24 is about 10 mm in the embodiment, with respect to the width W (about 0.5 mm) of the base film 17. In addition, the length of the extension film 24 is a length to an extent such that the power-feeding film 51 reaches from the base film 17 to the side wall part 34 of the lamp lens 4. While, in FIG. 4, it is shown that a left end part of the extension film 24 is positioned more leftward than the wire heater 5, the left end part of the extension film 24 and the wire heater 5 are actually positioned on a substantially same line. On the other hand, the width of the power-feeding film 51 is greater than the width W1 of the extension film 24. In addition, the length of the power-feeding film 51 is shorter than that of the extension film 24.

Like the electrically conductive paste 19 for heater, the electrically conductive paste 25 for extension of the extension portion 6 and the power-feeding electrically conductive paste 49 of the power-feeding portion 50 are electrically conductive ink, and are made of a metal paste such as a silver paste, a gold paste, a copper paste, or an aluminum paste in the embodiment. The width of a respective one of the electrically conductive paste 25 for extension and the power-feeding electrically conductive paste 49 is greater than that of the electrically conductive paste 19 for heater and the length of a respective one of the electrically conductive paste 25 for extension and the power-feeding electrically conductive paste 49 is shorter than that of the electrically conductive paste 19 for heater, whereby their electrical resistance value is smaller than that of the electrically conductive paste 19 for heater. The width of the power-feeding electrically conductive paste 49 is greater than that of the electrically conductive paste 25 for extension, and the length of the power-feeding electrically conductive paste 49 is shorter than that of the electrically conductive paste 25 for extension.

On one face of a respective one of the extension film 24 and the power-feeding film 51, a resist (not shown) may be provided so as to cover a respective one of the electrically conductive paste 25 for extension and the power-feeding electrically conductive paste 49. Like the resist 20, the resist is adapted to electrically insulate the electrically conductive paste 25 for extension and the power-feeding electrically conductive paste 49 and protect from an external shock. In other words, the resist is a surface protection coat of the electrically conductive paste 25 for extension and the power-feeding electrically conductive paste 49. Like the resist 20, the abovementioned resist is made of a urethane-based or acryl-based adhesive in the embodiment.

In addition, at least one of the extension film 24 and the power-feeding film 51 or the resist is colored. In other words, a colored layer is provided on one face and/or the other face of a respective one of the extension film 24 and the power-feeding film 51. Alternatively, the extension film 24 and the power-feeding film 51 per se or the resist per se are/is colored.

Figure 7:
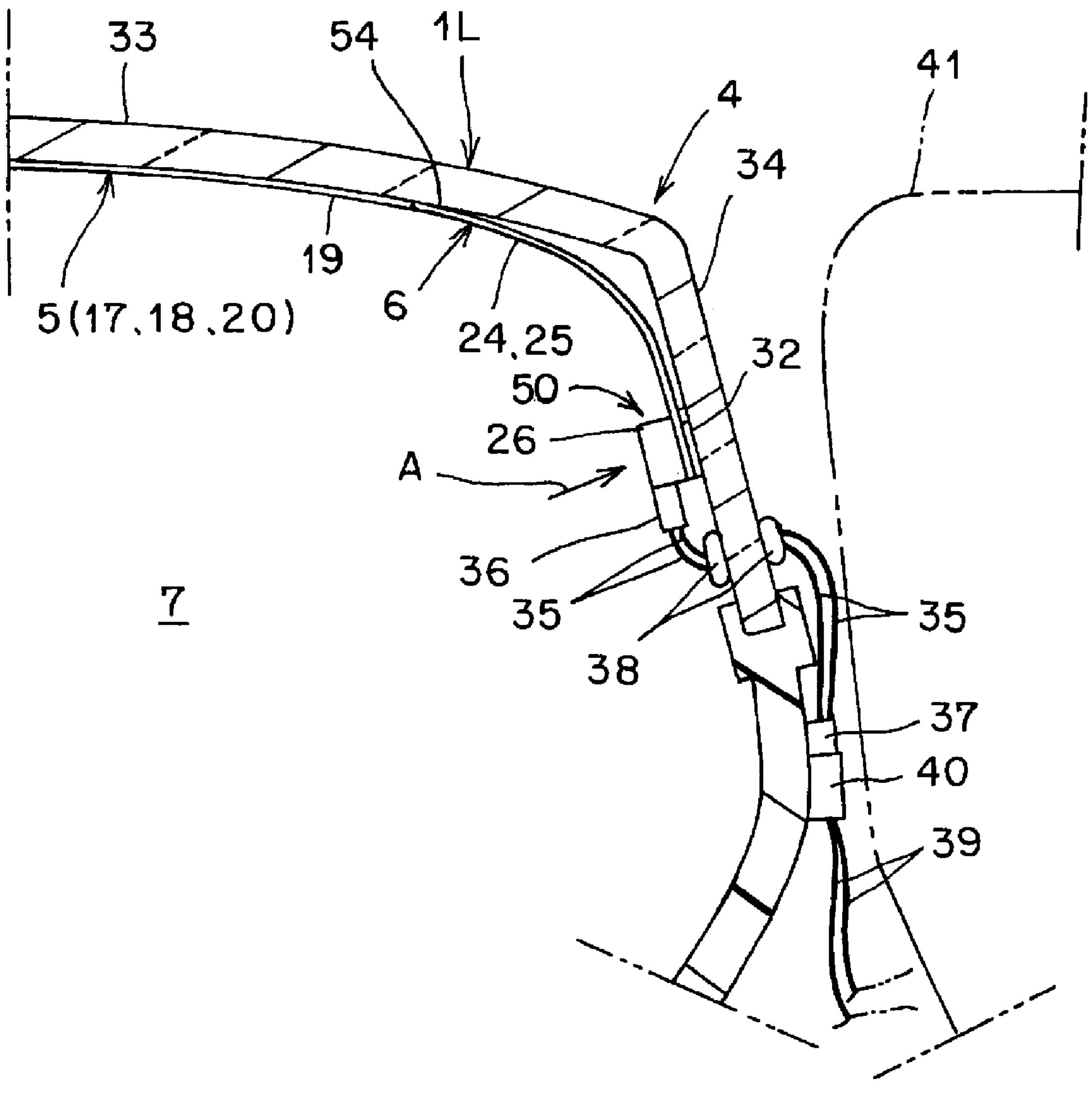
FIG. 7 is a horizontal cross-sectional view (transverse cross-sectional view) showing a part of the headlamp, in particular, a wiring state between a power-feeding portion and a power source side, similarly.

The connector 26 is electrically connected to the power-feeding electrically conductive paste 49 and is fixed to the power-feeding film 51. The connector 26, as shown in FIGS. 4, 7, and 9, is made up of: one base (not shown) made of an insulation member, for example a resin; two male terminals 28 made of an electrically conductive member, for example a metal; and two grommets (not shown) as a swaging tool. Apart from the connector 26, as a connector, there may be employed: a connector made up of: a terminal set at the power-feeding electrically conductive paste 49 on one face of the power-feeding film 51; a grommeted terminal board formed by swaging the terminal and the power-feeding portion 50; and a resin board formed by swaging the terminal, the power-feeding portion 50, and the grommeted terminal board, or alternatively, a connector made up of: a terminal set at the power-feeding electrically conductive paste 49 on one face of the power-feeding film 51; and a resin board formed by swaging the terminal and the power-feeding portion 50.

Hereinafter, a procedure for assembling between the power-feeding film 51 and the power-feeding electrically conductive paste 49 of the power-feeding portion 50; and the connector 26 will be described. First, on one face of the base, the power-feeding film 51 is set so that the power-feeding electrically conductive paste 49 does not face to the base. Next, a fixing portion of the two male terminals 28 is set at the two power-feeding electrically conductive pastes 49. Afterwards, the two grommets are swaged by passing them through the base and the power-feeding film 51 and the two power-feeding electrically conductive pastes 49 and the two male terminals 28. As a result, by means of the two grommets, the power-feeding film 51 and the two power-feeding electrically conductive pastes 49 are swaged between the base and the fixing portion of the two male terminals 28. In this manner, the connector 26 is fixed to the power-feeding film 51 of the power-feeding portion 50, and the male terminal 28 of the connector 26 is electrically connected to the power-feeding electrically conductive pastes 49 of the power-feeding portion 50.

On one face of the base, a sealant (not shown) made of silicon, for example, is provided so as to cover the two grommets and the fixing portion of the two male terminals 28 and the power-feeding film 51 and the power-feeding electrically conductive paste 49 of the power-feeding portion 50. The sealant is adapted to cover and electrically insulate the two power-feeding electrically conductive pastes 49 that are electrically connecting portions and the fixing portion of the two male terminals 28 and the two grommets and protect from an external shock. In a case where a resist is provided on one face of the power-feeding film 51, such a result is not provided at a portion at which the fixing portion of the two male terminals 28 is to be set, among the two power-feeding electrically conductive pastes 29. In this manner, the power-feeding film 51 and the power-feeding electrically conductive pastes 49 of the power-feeding portion 50; and the connector 26 are assembled.

The other face of the base is adhered and fixed to an interior face of the side wall part 34 of the lamp lens 4, by means of an adhesive 32 such as a double-sided tape (double-sided adhesive tape) having sufficient durability. Apart from the adhesive 32, the base and the interior face of the side wall part 34 of the lamp lens 4 may be fixed by means of welding or screw tightening. As a result, in the power-feeding portion 50, the connector 26 is fixed to the interior face of the side wall part 34 of the lamp lens 4, together with the power-feeding film 51. In this manner, the extension portion 6 is provided on the front part 33 of the lamp lens 4 and the interior face of the side wall part 34, and the power-feeding portion 50 is provided on the interior face of the side wall part 34 of the lamp lens 4.

At this time, as shown in FIG. 7, both ends of the extension film 24 of the extension portion 6 are fixed, respectively, via the wire heater 5 and the adhesive part 54 and the connector 26, onto an interior face of the front part 33 of the lamp lens 4 and an interior face of the side wall part 34. In addition, an intermediate part of the extension film 24 of the extension portion 6 is bent along a corner between the front part 33 and the side wall part 34, of the lamp lens 4. As a result, the intermediate part of the extension film 24 of the extension portion 6 is reliably maintained in a state in which it is bent along the corner of the lamp lens 4, by means of a resilient restoration force (see the arrow "A" indicated by the solid line in FIG. 7). In this manner, the extension portion 6 is reliably fixed onto the interior face of the front part 33 and the side wall part 34, of the lamp lens 4.

As shown in FIG. 7, two heater-side harnesses 35 are electrically connected to the connector 26. In other words, a respective one of two female terminals 36 made of an electrically conductive member, for example a metal, is mounted and electrically connected to one end of a respective one of the two heater-side harnesses 35. The two female terminals 36 are removably coupled to the two male terminals 28 of the connector 26, respectively. As a result, the connector 26 and the heater-side harness 35 are electrically connected to each other.

As shown in FIG. 7, a heater-side connector 37 is mounted and electrically connected to the other end of a respective one of the two heater-side harnesses 35. The two heater-side harnesses 35 are pulled out from the inside of the lamp room 7 to the outside of the lamp room 7, via a waterproof structure provided at the side wall part 34 of the lamp lens 4, for example via a rubber-based waterproof grommet 38 in the embodiment. The two heater-side harnesses 35 may be pulled out from the inside of the lamp room 7 to the outside of the lamp room 7, via a waterproof structure provided in the lamp housing 3, for example via a rubber-based waterproof grommet (not shown) in the embodiment.

In FIG. 7, reference numeral 39 designates two power source-side harnesses, a respective one of which is electrically connected to a power source at one end thereof. A power source-side connector 40 is mounted and electrically connected to the other end of a respective one of the two power source-side harnesses 39. The heater-side connector 37 is removably connected to the power source-side connector 40. As a result, the wire heater 5 is electrically connected to a power source via the power-feeding portion 50 and the extension portion 6.

The power source-side connector 40 is fixed outside of the lamp room 7 of the lamp housing 3. As a result, part of the heater-side harness 35, the heater-side connector 37, the power source-side connector 40, the power source-side harness 39 are positioned outside of the lamp room 7 of the lamp housing 3.

Outside of the headlamp 1L of the vehicle lighting device according to the embodiment, other vehicle parts 41 (such as another vehicle lighting device, a bumper, decorative parts, for example) are provided adjacently. A part of the heater-side harness 35, the heater-side connector 37, the power source-side connector 40, the power source-sided harness 39, positioned outside of the lamp room 7 of the lamp housing 3, cannot be seen from the outside because they are positioned between the headlamp 1L of the vehicle lighting device according to this embodiment and other vehicle parts 41; and therefore, there is no problem on appearance.

The wire heater 5 is connected to a manual switch (not shown) or an auto switch (not shown), via the extension portion 6 and the power-feeding portion 50. The manual switch is adapted to manually turn ON/OFF a power current feed to the wire heater 5. The auto switch is adapted to automatically turn ON/OFF a power current feed to the wire heater 5.

The auto switch is made up of a control portion such as ECU and a detection portion such as a temperature sensor or an optical sensor. The detection portion detects an ambient environment of an automobile C, for example a temperature outside of the automobile C or light illuminated from the lamp lens 4, and outputs the detection signal to the control portion. The control portion judges whether or not snow, ice, or cloud, etc., adheres to the lamp lens 4, based upon the detection signal from the detection portion or whether or not a temperature is reached to an extent such that snow, ice, or cloud adheres to the lamp lens 4. Afterwards, upon judging that snow, ice, or cloud, etc., adheres to the lamp lens 4 or upon judging that a temperature is reached to an extent such that snow, ice, or cloud, etc., adheres to the lamp lens 4, a power current is fed to the wire heater 5 via the power-feeding portion 50 and the extension portion 6. On the other hand, upon judging that no snow, ice, cloud, etc., adheres to the lamp lens 4 or upon judging that a temperature is not reached to an extent such that snow, ice, or cloud, etc., adheres to the lamp lens 4, a power current feed to the wire heater 5 via the power-feeding portion 50 and the extension portion 6 is interrupted.

A temperature control portion (not shown) is provided at one terminal portion of the wire heater 5. The temperature control portion controls a heating temperature of the electrically conductive paste 19 for heater. As the temperature control portion, for example, a PTC thermistor is used. This PTC thermistor has a feature that no power is fed if a temperature rises, a resistance value increases, and a predetermined resistance value is then reached. For example, in a case where the lamp lens 4 is made of polycarbonate (PC), a heat-resistance temperature of the lamp lens 4 is about 130 degrees Celsius, and thus, a PTC thermistor having a resistance feature that no power is fed at a time point when the heating temperature of the electrically conductive paste 19 for heater has reached around about 60 degrees Celsius is used as the temperature control portion.

Hereinafter, referring to FIGS. 10A to 10G, a description will be given with respect to a process of manufacturing the wire heater 5 to be transferred to the lamp lens 4 of headlamps 1L, 1R of the vehicle lighting device according to this embodiment (the extension portion 6 and the power-feeding portion 50 are included, but are not shown in FIGS. 10A to 10G) and a transfer process of transferring the wire heater 5 to the lamp lens 4. First, among films, the adhesive (adhesive layer, viscous layer) 18 and the adhesive part 54 (viscous layer) are provided at one face (bottom face) of a portion corresponding to the base film 17 and of a portion corresponding to a part of the extension film 24 (the adhesive part 54 of the extension); and the adhesive 18 and a sheet member 23 which is formed by releasably adhering a release sheet 22 such as a release film or release paper to the adhesive part 54 are manufactured (see FIG. 10A). The sheet member 23 has a size to an extent such that the wire heater 5 and the extension portion 6 and the power-feeding portion 50, shaped like a pattern that follows a wire pattern of the electrically conductive paste 19 for heater and the electrically conductive paste 25 for extension and the power-feeding electrically conductive paste 49, can be formed.

Figure 10A:
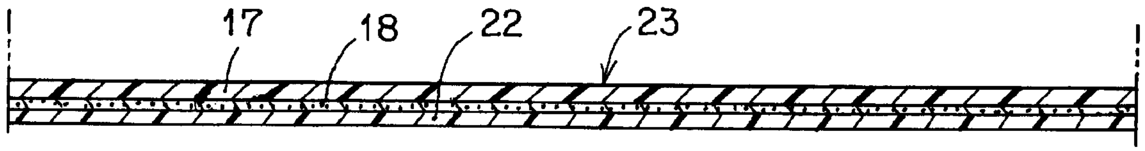
FIGS. 10A to 10G are explanatory views showing a process of manufacturing a wire heater to be transferred to a lamp lens and a transfer process of transferring a wire heater to a lamp lens, similarly.
Figure 10B:
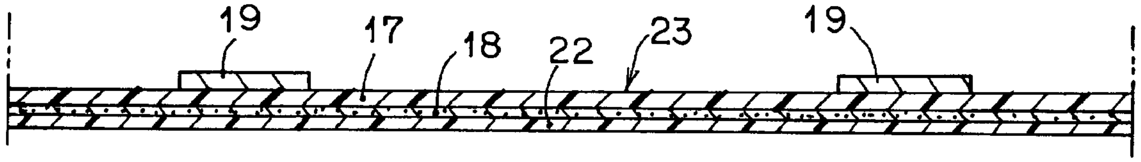

Next, on the base film 17 of the sheet member 23, and the other face (top face) of the extension film 24 extended from the base film 17, and the power-feeding film 51, the electrically conductive paste 19 for heater, the electrically conductive paste 25 for extension, and the power-feeding electrically conductive paste 49 are printed by means of a processing technique such as screen printing or hot stamp printing, and the printed pastes are formed on a wire pattern (see FIG. 10B).

Subsequently, on the other face (top face) of the base film 17 of the sheet member 23, the resist (insulation layer-compatible protection film) 20 is printed by means of the processing technique such as screen printing or hot stamp printing, for example, and the printed resist is provided so as to cover the electrically conductive paste 19 for heater (see FIG. 11C). At this time, on the extension film 24 and the other face (top face) of the power-feeding film 51, the resist (insulation layer-compatible protection film) is printed simultaneously by means of the processing technique such as screen printing or hot stamp printing, whereby the resist may be provided so as to cover the electrically conductive paste 25 for extension and the power-feeding electrically conductive paste 49.

Figure 10C:
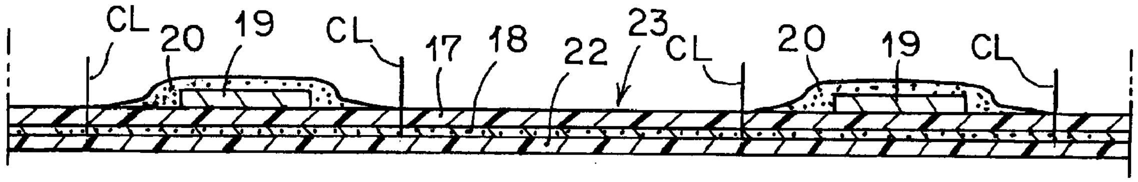
Figure 10D:
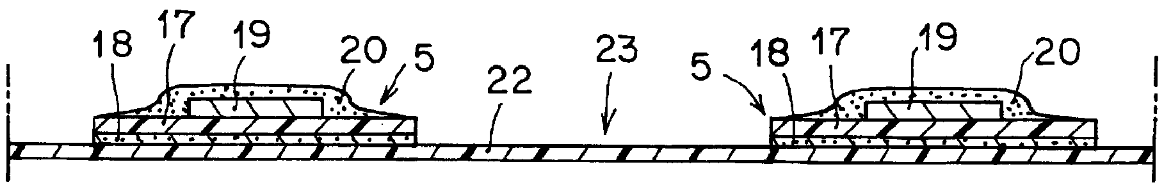

Afterwards, the base film 17 of the sheet member 23 and the adhesive 18 are cut in a pattern that follows a wire pattern of the electrically conductive paste 19 for heater by means of punching processing, for example (see FIG. 10D). In other words, a cutter (not shown) is pushed from the side of the resist 20 into the base film 17 and the adhesive 18 and is stopped at a boundary between the adhesive 18 and the release sheet 22, and the base film 17 and the adhesive 18 are cut. In FIG. 10C, the solid line CL indicates a cut part of the base film 17 and the adhesive 18. The cutter is released from the sheet member 23 and, among the cut base film 17 and adhesive 18, a redundant portion other than a portion of the pattern that follows a wire pattern of the electrically conductive paste 19 for heater is released from the release sheet 22. At this time, the extension film 24 is cut in a predetermined width W1 and in a predetermined length, and simultaneously, the power-feeding film 51 is also cut in a predetermine width and in a predetermined length.

In this manner, as shown in FIG. 10D, there are left: the release sheet 22 of the sheet member 23 that has not been cut; the base film 17 and the adhesive 18 having been cut in the pattern that follows the wire pattern of the electrically conductive paste 19 for heater; the electrically conductive paste 19 for heater of the wire pattern; and the resist 20 provided in the pattern that follows the wire pattern of the electrically conductive paste 19 for heater. A cut width W of the base film 17 and the adhesive 18 is a width substantially equal to that of the resist 20 in the embodiment; a width defined to an extent such that the resist 20 can cover the electrically conductive paste 19 for heater, i.e., a width defined to an extent such that the resist 20 can seal and electrically insulate the electrically conductive paste 19 for heater and can protect from an external shock. The cut width of the base film 17 is not limitative to the cut width W.

Figure 10E:
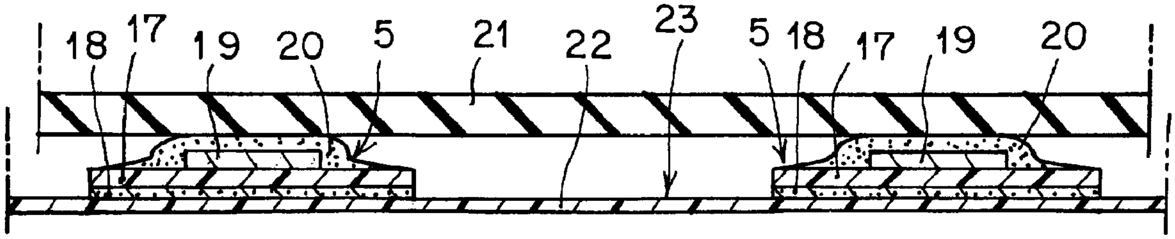
Figure 10F:
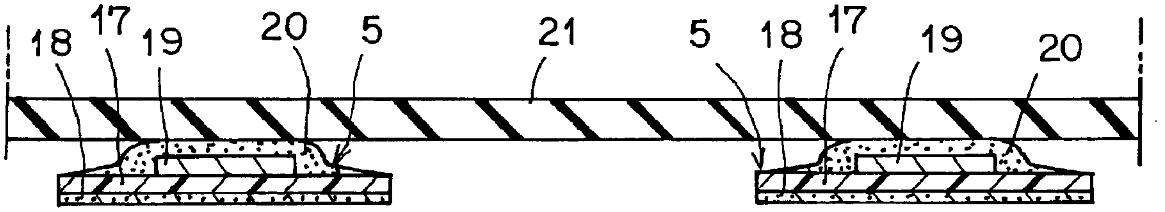
Figure 10G:
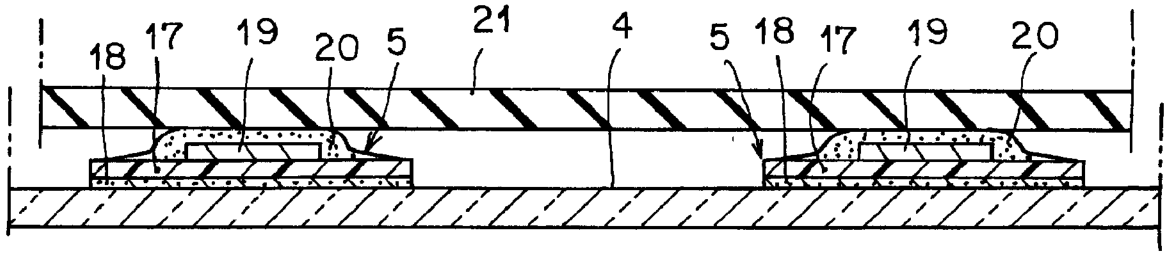

After the base film 17 of the sheet member 23 and the adhesive 18 have been cut in the pattern that follows the wire pattern of the electrically conductive paste 19 for heater, the separator 21 is disposed at the side of the resist 20 (see FIG. 10E). In this manner, the release sheet 22 of the sheet member 23, which has not been cut; the base film 17 and the adhesive 18, having been cut in the pattern that follows the wire pattern of the electrically conductive paste 19 for heater; the electrically conductive paste 19 for heater of the wire pattern; and the resist 20 provided in the pattern that follows the wire pattern of the electrically conductive paste 19 for heater, are placed on the separator 21 with the side of resist 20 being oriented downwardly. As a result, a unit of the wire heater 5 (including the extension portion 6 and the power-feeding portion 50) is manufactured. The unit is made of: the wire heater 5 (including the extension portion 6 and the power-feeding portion 50), made up of: the base film 17 and the adhesive 18; and the electrically conductive paste 19 for heater and the resist 20; and the separator 21 and the release sheet 22 of the sheet member 23.

Next, the release sheet 22 of the unit manufactured as described above is released (see FIG. 10F). Afterwards, using the separator 21 disposed at the side of the resist 20, the adhesive 18 is adhered to an interior face of the lamp lens 4, and the electrically conductive paste 19 for heater of the wire pattern is transferred to an interior face of the front part 33 of the lamp lens 4 (see FIG. 10G). The separator 21 is then released from the resist 20. In this manner, as shown in FIGS. 4 to 7 and 12, the wire heater 5 is transferred to the interior face of the front part 33 of the lamp lens 4. At this time, a part at the side of the wire heater 5 of the extension portion 6 is adhered to the interior face of the front part 33 of the lamp lens 4 by means of the adhesive 54.

The vehicle lighting device according to this embodiment is made of the above-described constituent elements. Hereinafter, a functional description of these constituent elements will be given.

Semiconductor-type light sources 12 of five lamp units 2 are lit, respectively. The light from the semiconductor-type light sources 12 of the five lamp units 2 is then reflected on a reflecting surface 10 of an upper reflector 8; a part of the reflected light is cut off by means of a shade 11 of a lower reflector 9; and remains of the reflected light passes through a projecting lens 13 and the front part 33 of the lamp lens 4, and is externally illuminated in a predetermined light distribution pattern having a cutoff line, i.e., in a light distribution pattern for passing. This cutoff line of the light distribution pattern for passing is formed by an edge of the shade 11. In addition, the reflected light from the reflecting surface 10, the reflected light having been reflected on the reflecting surface of the shade 11, can be utilized by providing a reflecting surface on the shade 11.

A wire heater 5 provided for transfer on the front part 33 of the lamp lens 4 is made of a linear pattern, thus allowing an optical loss or an influence of light distribution, etc., to be minimized when light passes through the front part 33 of the lamp lens 4. Moreover, a lamp unit 2 employing a semiconductor-type light source 12 as a light source is used, thus reducing a width of the light illuminated from the lamp unit 2. Therefore, the light with its small width is passed between linear patterns of the wire heater 5, thereby making it possible to further prevent an optical loss or an influence of light distribution, etc.

A heat is hardly generated to the light from the semiconductor-type light source 12, thus allowing snow, ice, or cloud to easily adhere to the lamp lens 4. In this case, by means of a manual switch and an auto switch, a power current is fed to the wire heater 5 provided by means of transfer at the front part 33 of the lamp lens 4 via the power-feeding portion 50 and the extension portion 6.

When the power current is fed to the wire heater 5, the wire heater 5 generates a heat, due to an electrical resistance of the wire heater 5. Owing to a heat generation effect of this wire heater 5, the lamp lens 4 is warmed, the adhering of snow, ice, or cloud to the lamp lens 4 is prevented, or the snow, ice, or cloud adhering to the lamp lens 4 is melted or removed. As a result, a loss of the light illuminated from the front part 33 of the lamp lens 4 can be prevented.

At this time, due to a snowball effect that, by melting the snow or ice at a part corresponding to the electrically conductive paste 19 for heater, among the front part 33 of the lamp lens 4, the melted snow or ice slides on a surface of the front part 33 of the lamp lens 4, the snow or ice adhering to a part which does not correspond to the electrically conductive paste 19 for heater, of the front part 33 of the lamp lens 4, is stripped off from the surface of the front part 33 of the lamp lens 4. As a result, the snow, ice, or cloud adhering to the lamp lens 4 can be reliably removed.

If the heat generation temperature of the wire heater 5 reaches a predetermined temperature in the heat generation effect of the wire heater 5, the feeding of a power current to the wire heater 5 is controlled, and the heat generation temperature of the wire heater 5 is retained at a temperature close to the predetermined temperature due to a temperature control effect of a temperature control portion. As a result, a lamp lens 4 made of resin with a comparatively low heat resistance temperature can be protected from overheat.

After the adhering of snow, ice, or cloud to the lamp lens 4 has been prevented and the snow, ice, or cloud having adhered to the lamp lens has been melted or removed, the power current feeding to the wire heater 5 provided on the lamp lens 4 is interrupted by means of a manual switch or/and an auto switch.

The vehicle lighting device according to the embodiment is made of the above-described constituent elements and functions. Hereinafter, advantageous effect(s) of the vehicle lighting device will be described.

In the vehicle lighting device according to the embodiment, a rough letterpress printed-film pattern 55 is provided on a face at a side opposite to the lamp lens 4 and a part other than the adhesive part 54, of the extension film 24 of the extension portion 6. Thus, by means of the letterpress printed-film pattern 55 of this rough portion can reliably prevent the extension film 24 of the extension portion 6 from adhering to the lamp lens 4 can be reliably prevented, and impairment of appearance due to adhering of the extension film 24 of the extension portion 6 to the lamp lens 4 can be prevented, making it possible to improve its appearance.

Furthermore, in the vehicle lighting device according to the embodiment, of the extension film 24 of the extension portion 6, the adhesive part 54 was provided at a part of a face at a side opposite to the lamp lens 4, and thus, by means of the adhesive part 54 of such a part, the extension film 24 of the extension portion 6 can be reliably adhered to the interior face of the front part 33 of the lamp lens 4 and its appearance or design is never degraded. In other words, it is difficult to adhere the entirety of the extension film 24 of the extension portion 6 to a curved face of the interior face of the front part 33 of the lamp lens, and its appearance or design is degraded, or alternatively, if the extension film 24 of the extension portion 6 is not entirely adhered to the interior face of the front part 33 of the lamp lens 4, the wire heater 5 may be released from the interior face of the front part 33 of the lamp lens 4, with a load being applied to the adhesive 18 of the wire heater 5. However, in the vehicle lighting device according to this embodiment, a part of the extension film 24 of the extension portion 6 is adhered to the interior face of the front part 33 of the lamp lens 4, thus allowing the extension film 24 of the extension portion 6 to be reliably adhered to the interior face of the front part 33 of the lamp lens 4 and never degrading its appearance or design.

Moreover, in the vehicle lighting device according to the embodiment, an extension portion 6 made up of an extension film 24 and an electrically conductive paste 25 for extension was provided between a wire heater 5 and the power-feeding portion 50, thus eliminating a harness. As a result, the vehicle lighting device according to this embodiment can achieve lower manufacturing cost, in comparison with a vehicle lighting device in which a power-feeding portion is made of a harness. In addition, the vehicle lighting device solves a problem on durability that, due to the weight of the harness, the wire heater 5 transferred to the lamp lens 4 is released from the lamp lens 4, a load is applied on the wire heater 5, or the lamp lens 4 is damaged by the harness.

In addition, in the vehicle lighting device according to the embodiment, by means of the extension portion 6 provided between the wire heater 5 and the power-feeding portion 50, the wire heater 5 and the power-feeding portion 50 can be provided, respectively, at other separate positions of the lamp lens 4, for example, at the front part 33 and the side wall part 34 of the lamp lens 4, respectively, with an electrical connection being maintained. As a result, in the vehicle lighting device according to this embodiment, the wire heater 5 can be provided at a portion to be illuminated with light, i.e., at the front part 33, of the lamp lens 4; and the power-feeding portion 50 can be provided at an inconspicuous portion of the lamp lens 4, i.e., at a portion which is not illuminated with light, the portion being not required to provide the wire heater 5, for example, at the side wall part 34 to be mounted to a lamp housing. In this manner, in the vehicle lighting device according to this embodiment, there is no need to provide the power-feeding portion 50 at a conspicuous portion of the lamp lens 4, i.e., at the front part 33. Thus, in particular, a problem, such as impairment on appearance or impairment on design in a frontal view of the lamp lens 4, can be solved. In addition, there is no need to provide the wire heater 5 at a position reaching up to an inconspicuous portion, i.e., up to the side wall part 34, of the lamp lens 4. Therefore, a problem on manufacturing cost or power consumption can also be solved.

In particular, in the vehicle lighting device according to the embodiment, by means of the extension portion 6 provided between the wire heater 5 and the power-feeding portion 50, the wire heater 5 and the power-feeding portion 50 can be fixed at other separate positions of the lamp lens 4, respectively, thus allowing the wire heater 5 to be reliably and easily transferred to the lamp lens 4. In other words, it is difficult to adjacently transfer the wire heater 5 and the power-feeding portion 50 having a larger width than that of the wire heater 5 to the lamp lens 4. However, in the vehicle lighting device according to this embodiment, there is no need to adjacently fix the wire heater 5 and the power-feeding portion 50 having a larger width than that of the wire heater 5 to the lamp lens 4, thus allowing the wire heater 5 to be reliably and easily transferred to the lamp lens 4.

Furthermore, in the vehicle lighting device according to the embodiment, the wire heater 5 is made up of the base film (film for heater) 17 and the electrically conductive paste 19 for heater, whereas the extension portion 6 is made up of the extension film 24 and the electrically conductive paste 25 for extension, and further, the power-feeding portion 50 is made up of the power-feeding film 51 and the power-feeding electrically conductive paste 49. Thus, in the vehicle lighting device according to this embodiment, the base film (film for heater) 17 of the wire heater 5, the extension film 24 of the extension portion 6, and the power-feeding film 51 of the power-feeding portion 50; and the electrically conductive paste 19 for heater of the wire heater 5, the electrically conductive paste 25 for extension of the extension portion 6, and the power-feeding electrically conductive paste 49 of the power-feeding portion 50 can be manufactured in the same process, and there is no need for a new manufacturing process, thus making it possible to reduce the manufacturing cost accordingly.

Still furthermore, in the vehicle lighting device according to the embodiment, the adhesive part 54 of the extension portion 6 is provided at the side of the wire heater 5. Thus a load on the adhesive 18 of the wire heater 5 can be reduced by the adhesive part 54 of the extension portion 6 at the side of this wire heater 5, and the wire heater 5 can be prevented from being released from the lamp lens 4 accordingly.

Yet furthermore, in the vehicle lighting device according to the embodiment, a wire pattern of the electrically conductive paste 25 for extension of the extension portion 6 and a wire pattern of the power-feeding electrically conductive paste 49 of the power-feeding portion 50 each are thick and short in comparison with a wire pattern of the electrically conductive paste 19 for heater of the wire heater 5. Thus, the electrical resistance value of a respective one of the wire pattern of the electrically conductive paste 25 for extension of the extension portion 6 and the wire pattern of the power-feeding electrically conductive paste 49 of the power-feeding portion 50, is small in comparison with the electrical resistance value of the wire pattern of the electrically conductive paste 19 for heater of the wire heater 5. Accordingly, a power current can be fed to the wire heater 5 without a temperature rise in the wire pattern of the electrically conductive paste 25 for extension of the extension portion 6, and wire pattern of the power-feeding electrically conductive paste 49 of the power-feeding portion 50. As a result, the vehicle lighting device according to this embodiment can achieve power saving, and moreover, even if the electrically conductive paste 25 for extension of the extension portion 6 and the power-feeding electrically conductive paste 49 of the power-feeding portion 50 are electrically connected to the electrically conductive paste 19 for heater of the wire heater 5, a design on the electrical resistance value of the wire pattern of the electrically conductive paste 19 for heater of the wire heater 5 is not influenced. (This wire pattern has thin and long wires, thus there being a limitation to uniformly obtaining the electrical resistance values all over the required parts).

Hereinafter, examples other than the embodiment will be described. In the embodiment, the wire heater 5 was provided on the interior face of the front part 33 of the lamp lens 4, whereas in the present invention, the wire heater 5 may be provided on an exterior face or both of the interior and exterior faces of the lamp lens 4 in the present invention.

In addition, in the embodiment, the wire heater 5 was provided on the interior face of the front part 33 of the lamp lens 4, whereas in the present invention, at least two heating portions, a high-temperature heating portion and a low-temperature heating portion, may be formed at a wire heater.

Further, the embodiment described an example used in the lamp lens 4 of the head lamps 1L, 1R of the automobile C. Whereas in the present invention, it may be used in a vehicle lighting device other than the headlamps 1L, 1R of the automobile C, for example, signal light such as a stop lamp, illumination light such as a curve lamp, a front combination lamp, or a rear combination lamp.

Furthermore, as a light illuminating portion for illuminating light to the outside through the front part 33 of the lamp lens 4, the embodiment described the projector type lamp unit 2 employing the semiconductor-type light source 12 as a light source, whereas in the present invention, the light illuminating portion may be a light illuminating portion other than the lamp unit 2. For example, it may be a lamp unit of a projector type, a reflection type, or a direct projection type, of which a light source is a semiconductor-type light source, a power discharge lamp such as HID, a halogen bulb, or an incandescent bulb. Alternatively, in a vehicle lighting device of a projector type, a reflection type, or a direct projection type, it may be a semiconductor-type light source, a light source of a power discharge lamp such as HID, a halogen bulb, or an incandescent bulb, and a combination of the light source and a reflecting surface.

Still furthermore, in the embodiment, the adhesive part 54 of the extension portion 6 was provided at the side of the wire heater 5, whereas in the present invention, the adhesive part 54 of the extension portion 6 may not be provided at any position of the extension portion 6.

What is claimed is:

1. A vehicle lighting device, comprising:

(i) a lamp housing, which partitions a lamp room, and a lamp lens;

(ii) a light illumination portion which is disposed in the lamp room, for illuminating light to an outside through the lamp lens;

(iii) a wire heater which is provided, by means of transfer, at a portion through which light from the light illumination portion is permeated, among the lamp lens;

(iv) an extension portion which is integrally provided by a predetermined length from the wire heater; and (v) a power feeding portion which is provided at a tip end part of the extension portion, for feeding a power current to the wire heater via the extension portion, wherein the wire heater is a transfer-type wire heater including:

(a) a base film;

(b) an adhesive which is provided on one face of the base film;

(c) an electrically conductive member for heater, which is formed in a wire pattern on the other face of the base film, a power current being fed, thereby generating a heat;

(d) a resist which is provided on the other face of the base film so as to cover the electrically conductive member for heater, at least the base film being cut in a pattern that follows the wire pattern of the electrically conductive member for heater and which is caused to adhere the adhesive to the lamp lens, thereby transferring the electrically conductive member for heater to the lamp lens, the extension portion including:

(e) an extension film which is integrally provided by a predetermined length from the base film; and (f) an electrically conductive member for extension which is formed in a wire pattern on one face of the extension film, one end of which is electrically connected to the electrically conductive member for heater, an adhesive part to be adhered to the lamp lens being provided at a part of a face at a side opposite to the lamp lens, among the extension film, a rough portion being provided on the face at the side opposite to the lamp lens, among the extension film of the extension portion, the face being a portion other than the adhesive portion, the power-feeding portion including:

(g) a power-feeding film which is integrally provided at a tip end part of the extension film;

(h) a power-feeding electrically conductive member which is formed in a wire pattern on one face of the power-feeding film, one end of which is electrically connected to the electrically conductive member for extension; and (i) a connector which is electrically connected to the power-feeding electrically conductive member and is fixed to the lamp lens, together with the power-feeding film.

2. The vehicle lighting device according to claim 1, wherein:

the adhesive part of the extension portion is provided at a side of the wire heater.

3. The vehicle lighting device according to claim 1, wherein:

a wire pattern of the electrically conductive member for extension of the extension portion and a wire pattern of the power-feeding electrically conductive member of the power-feeding portion each are thick and short in comparison with a wire pattern of the electrically conductive member for heater, of the wire heater.

4. A vehicle lighting device, comprising:

(i) a lamp lens;

(ii) a wire heater which is transferred to an interior face of the lamp lens and is capable of generating a heat in accordance with feeding of a power current;

(iii) a power-feeding portion for feeding the power current to the wire heater; and (iv) an extension portion which is extended from the wire heater by a predetermined length, is arranged on the interior face of the lamp lens, and electrically connects the wire heater and the power-feeding portion in order to feed the power current from the power-feeding portion to a side of the wire heater, the extension portion including:

an adhesive part which is disposed on a face opposite to the interior face of the lamp lens, for adhering to the interior face of the lamp lens; and a non-adhesive part which is disposed on the face opposite to the interior face of the lamp lens and which is constituted in a manner free of adhering to the interior face of the lamp lens so as to prevent a part other than the adhesive part from sticking to an interior face of the lamp lens.

5. The vehicle lighting device according to claim 4, wherein:

the non-adhesive part is constituted of a rough portion formed by a optically permeable letterpress printed-film pattern.

6. The vehicle lighting device according to claim 4, wherein:

the non-adhesive part of the extension portion includes at least any of:

a letterpress printed-film pattern forming a rough line in a lengthwise direction of the extension portion;

a letterpress printed-film pattern forming a rough line, orthogonal to the lengthwise direction of the extension portion; and a letterpress printed-film pattern forming a rough line in a staggered shape, orthogonal to the lengthwise direction of the extension portion.

7. The vehicle lighting device according to claim 4, wherein:

the non-adhesive part of the extension portion is formed in a letterpress printed-film pattern having thickness of about 30 to 100 micrometers.

8. The vehicle lighting device according to claim 4, wherein:

the non-adhesive part of the extension portion is constituted so that an occupying area relative to the extension portion is wider than an occupying area of the adhesive part relative to the extension portion.

9. The vehicle lighting device according to claim 4, wherein:

the non-adhesive part of the extension portion constitutes the non-adhesive part having a non-adhesive property, together with the power-feeding portion; and a side of the power-feeding portion of the non-adhesive part is swaged and fixed together with a power terminal, by means of a swaging portion of the connector provided at the power-feeding portion, at a position of a side wall erected laterally in the lamp lens.

10. The vehicle lighting device according to claim 4, wherein:

the lamp lens causes a lamp unit having a light source to be disposed on a front face in the lens;

the wire heater is optically permeable and arranged on the front face in the lamp lens;

the power-feeding portion is arranged on the side wall erected laterally in the lamp lens; and the extension portion has a length connecting the wire heater and the power-feeding portion to each other.

11. The vehicle lighting device according to claim 4, wherein:

the extension portion is smaller than the wire heater in width.

12. The vehicle lighting device according to claim 4, wherein:

the wire heater includes an adhesive part adhering to the interior face of the lamp lens;

the adhesive part of the extension portion is arranged on a side of the wire heater, and constitute a viscous portion with viscous property, together with the adhesive part of the wire heater; and the adhesive part of the extension portion is adhered to the front face of the lamp lens by means of the adhesive part, together with the wire heater.

13. The vehicle lighting device according to claim 12, wherein:

the power-feeding portion has a connector, one end of which is connected to a power terminal, and is provided on the side wall erected laterally in the lamp lens, together with the connector; and a portion of the non-adhesive part of the extension portion connects to the other end of the connector and is fixed to the side wall in the lamp lens.

14. The vehicle lighting device according to claim 13, wherein:

the connector of the power-feeding portion includes a swaging portion for swaging and fixing the power terminal and the portion of the non-adhesive part of the extension portion in a multilayered state.

15. The vehicle lighting device according to claim 4, wherein:

at least part of the extension portion is manufactured in an identical process, together with the wire heater and the power-feeding portion.

16. The vehicle lighting device according to claim 4, wherein:

the wire heater includes:

an adhesive part adhering to the interior face of the lamp lens;

a resin film portion multilayered on the adhesive part;

an electrically conductive paste portion which is multilayered on the resin film portion and formed in a predetermined wire pattern, for generating a heat due to an electrical resistance in accordance with the feeding of the power current; and an insulation resist portion which is multilayered on the electrically conductive paste portion, for surface-protecting the electrically conductive paste portion;

the extension portion includes:

a resin film portion extended from the resin film portion of the wire heater; and an electrically conductive paste portion extended from the electrically conductive film portion of the wire heater, the extension portion in a process identical to that of manufacturing the resin film portion of the wire heater, the resin film portion of the extension portion is manufactured in a process identical to that of a resin film portion of the wire heater; and the electrically conductive paste portion of the extension portion is manufactured in a process identical to that of an electrically conductive paste portion of the wire heater.

17. The vehicle lighting device according to claim 16, wherein:

the power-feeding portion includes:

a resin film portion extended from the resin film portion of the extension portion; and an electrically conductive paste portion extended from the electrically conductive paste portion of the extension portion, the resin film portion of the extension portion is manufactured in a process identical to that of a respective resin film of the wire heater and the power-feeding portion; and the electrically conductive paste portion of the extension portion is manufactured in a process identical to that of a respective electrically conductive paste portion of the wire heater and the power-feeding portion.

18. The vehicle lighting device according to claim 16, wherein:

the electrically conductive paste portion of the extension portion is thicker and shorter than the electrically conductive paste portion of the wire heater.

19. A vehicle lighting device, comprising:

(i) a lamp lens;

(ii) a wire heater which is transferred to an interior face of the lamp lens and is capable of generating a heat in accordance with feeding of a power current;

(iii) a power-feeding portion for feeding the power current to the wire heater; and (iv) an extension portion which is extended from the wire heater by a predetermined length, is arranged on the interior face of the lamp lens, and electrically connects the wire heater and the power-feeding portion in order to feed the power current from the power-feeding portion to a side of the wire heater, the extension portion including:

an adhesive portion which is disposed on a face opposite to the interior face of the lamp lens, for adhering to the interior face of the lamp lens;

an non-adhesive portion which is disposed on a face opposite to the interior face of the lamp lens and which is constituted in a manner free of adhering to the interior face of the lamp lens in order to prevent a part other than the adhesive part from adhering to the interior face of the lamp lens, wherein the adhesive part of the extension portion is fixed to a front face in the lamp lens, together with the wire heater; and the non-adhesive part of the extension portion is fixed on a side wall erected laterally in the lamp lens, together with the power-feeding portion.

20. The vehicle lighting device according to claim 19, wherein:

the non-adhesive part of the extension portion is made up of a rough portion formed by an optically permeable letterpress printed-film pattern.

* * * * *